(12) United States Patent
Vail

(10) Patent No.: US 8,080,071 B1
(45) Date of Patent: Dec. 20, 2011

(54) POLYCRYSTALLINE DIAMOND COMPACT, METHODS OF FABRICATING SAME, AND APPLICATIONS THEREFOR

(75) Inventor: Michael A. Vail, Genola, UT (US)

(73) Assignee: US Synthetic Corporation, Orem, UT (US)

(*) Notice: Subject to any disclaimer, the term of this patent is extended or adjusted under 35 U.S.C. 154(b) by 484 days.

(21) Appl. No.: 12/394,356

(22) Filed: Feb. 27, 2009

Related U.S. Application Data

(60) Provisional application No. 61/068,120, filed on Mar. 3, 2008.

(51) Int. Cl.
B24D 3/00 (2006.01)
B24D 11/00 (2006.01)
B24D 18/00 (2006.01)
E21B 10/36 (2006.01)

(52) U.S. Cl. .......................... 51/293; 175/434

(58) Field of Classification Search .............. 51/293; 175/434
See application file for complete search history.

(56) References Cited

U.S. PATENT DOCUMENTS

| | | |
|---|---|---|
| 2,349,577 A | 5/1944 | Dean |
| 3,745,623 A | 7/1973 | Wentorf, Jr. et al. |
| 4,063,909 A | 12/1977 | Mitchell |
| 4,191,735 A | 3/1980 | Nelson et al. |
| 4,224,380 A | 9/1980 | Bovenkerk et al. |
| 4,268,276 A | 5/1981 | Bovenkerk |
| 4,274,900 A | 6/1981 | Mueller et al. |
| 4,333,902 A | 6/1982 | Hara |
| 4,410,054 A | 10/1983 | Nagel et al. |
| 4,440,573 A | 4/1984 | Ishizuka |
| 4,468,138 A | 8/1984 | Nagel |
| 4,560,014 A | 12/1985 | Geczy |
| 4,738,322 A | 4/1988 | Hall et al. |
| 4,811,801 A | 3/1989 | Salesky et al. |
| 4,913,247 A | 4/1990 | Jones |
| 4,940,180 A | 7/1990 | Martell |
| 4,992,082 A | 2/1991 | Drawl et al. |
| 5,011,514 A | 4/1991 | Cho et al. |
| 5,016,718 A | 5/1991 | Tandberg |
| 5,049,164 A | 9/1991 | Horton et al. |
| 5,092,687 A | 3/1992 | Hall |

(Continued)

FOREIGN PATENT DOCUMENTS

GB 2300424 * 11/1996

(Continued)

OTHER PUBLICATIONS

U.S. Appl. No. 11/545,929, filed Oct. 10, 2006, Bertagnolli.

(Continued)

Primary Examiner — Jerry Lorengo
Assistant Examiner — Pegah Parvini
(74) Attorney, Agent, or Firm — Workman Nydegger

(57) ABSTRACT

Embodiments of the invention relate to polycrystalline diamond compacts ("PDCs") comprising a polycrystalline diamond ("PCD") table including a catalyst material therein that has been implanted with ions (e.g., carbon ions) and/or infiltrated from a host material implanted with carbon ions. In an embodiment, a PDC comprises a substrate and a PCD table bonded to the substrate. The PCD table includes a plurality of bonded diamond grains defining a plurality of interstitial regions. The PCD table includes an upper surface from which a region inwardly extends. At least a portion of the interstitial regions of the region includes a catalyst material disposed therein. At least a portion of the catalyst material may be at least saturated with carbon.

20 Claims, 9 Drawing Sheets

U.S. PATENT DOCUMENTS

| | | | |
|---|---|---|---|
| 5,120,327 | A | 6/1992 | Dennis |
| 5,127,923 | A | 7/1992 | Bunting et al. |
| 5,135,061 | A | 8/1992 | Newton, Jr. |
| 5,151,107 | A | 9/1992 | Cho et al. |
| 5,154,245 | A | 10/1992 | Waldenstrom et al. |
| 5,217,154 | A | 6/1993 | Elwood et al. |
| 5,348,109 | A | 9/1994 | Griffin et al. |
| 5,364,192 | A | 11/1994 | Damm et al. |
| 5,368,398 | A | 11/1994 | Damm et al. |
| 5,460,233 | A | 10/1995 | Meany et al. |
| 5,480,233 | A | 1/1996 | Cunningham |
| 5,544,713 | A | 8/1996 | Dennis |
| 6,054,693 | A | 4/2000 | Barmatz et al. |
| 6,209,429 | B1 | 4/2001 | Urso, III et al. |
| 6,302,225 | B1 | 10/2001 | Yoshida et al. |
| 6,410,085 | B1 | 6/2002 | Griffin et al. |
| 6,435,058 | B1 | 8/2002 | Matthias et al. |
| 6,481,511 | B2 | 11/2002 | Matthias et al. |
| 6,544,308 | B2 | 4/2003 | Griffin et al. |
| 6,562,462 | B2 | 5/2003 | Griffin et al. |
| 6,585,064 | B2 | 7/2003 | Griffin et al. |
| 6,589,640 | B2 | 7/2003 | Griffin et al. |
| 6,592,985 | B2 | 7/2003 | Griffin et al. |
| 6,601,662 | B2 | 8/2003 | Matthias et al. |
| 6,739,214 | B2 | 5/2004 | Griffin et al. |
| 6,749,033 | B2 | 6/2004 | Griffin et al. |
| 6,793,681 | B1 | 9/2004 | Pope et al. |
| 6,797,236 | B2 | 9/2004 | Stoschek |
| 6,797,326 | B2 | 9/2004 | Griffin et al. |
| 6,861,098 | B2 | 3/2005 | Griffin et al. |
| 6,861,137 | B2 | 3/2005 | Griffin et al. |
| 6,878,447 | B2 | 4/2005 | Griffin et al. |
| 7,060,641 | B2 | 6/2006 | Qian et al. |
| 7,377,341 | B2 | 5/2008 | Middlemiss et al. |
| 7,841,428 | B2 | 11/2010 | Bertagnolli |
| 7,942,219 | B2 | 5/2011 | Keshavan et al. |
| 2004/0155096 | A1 | 8/2004 | Zimmerman et al. |
| 2005/0044800 | A1 | 3/2005 | Hall et al. |
| 2007/0079994 | A1 | 4/2007 | Middlemiss |
| 2007/0187153 | A1 | 8/2007 | Bertagnolli |
| 2008/0185189 | A1 | 8/2008 | Griffo et al. |
| 2008/0223621 | A1 | 9/2008 | Middlemiss et al. |
| 2008/0223623 | A1 | 9/2008 | Keshavan et al. |
| 2008/0230280 | A1 | 9/2008 | Keshavan et al. |
| 2009/0090563 | A1 | 4/2009 | Voronin et al. |
| 2009/0173015 | A1 | 7/2009 | Keshavan et al. |
| 2009/0313908 | A1 | 12/2009 | Zhang et al. |
| 2010/0038148 | A1 | 2/2010 | King |
| 2010/0095602 | A1 | 4/2010 | Belnap et al. |
| 2010/0155149 | A1 | 6/2010 | Keshavan et al. |
| 2010/0181117 | A1 | 7/2010 | Scott |
| 2010/0236836 | A1 | 9/2010 | Voronin |
| 2010/0243336 | A1 | 9/2010 | Dourfaye et al. |
| 2010/0287845 | A1 | 11/2010 | Montross et al. |

FOREIGN PATENT DOCUMENTS

| | | |
|---|---|---|
| WO | WO 2010/100629 | 9/2010 |
| WO | WO 2010/100630 | 9/2010 |

OTHER PUBLICATIONS

U.S. Appl. No. 12/397,969, filed Apr. 9, 2009, Bertagnolli.
U.S. Appl. No. 12/548,584, filed Aug. 27, 2009, Bertagnolli.
U.S. Appl. No. 13/027,954, filed Feb. 15, 2011, Miess et al.
U.S. Appl. No. 13/100,388, filed May 4, 2011, Jones et al.
U.S. Appl. No. 61/068,120, filed Mar. 3, 2008, Vail.
Akaishi, Minoru, "Synthesis of polycrystalline diamond compact with magnesium carbonate and its physical properties," Diamond and Related Materials, 1996 (pp. 2-7).
Glowka, D.A. & Stone, C.M., "Effects of Termal and Mechanical Loading on PDC Bit Life", SPE Drilling Engineering, Jun. 1986 (pp. 201-214).
Hsueh, C.H. & Evans, A.G., "Residual Stresses in Metal/Ceramic Bonded Strips", J. Am. Ceram. Soc., 68 [5] (1985) pp. 241-248.
Lin, Tze-Pin; Hood, Michael & Cooper George A., "Residual Stresses in Polycrystalline Diamond Compacts", J. Am. Ceram Soc., 77 [6] (1994) pp. 1562-1568.
Radtke, Robert, "Faster Drilling, Longer Life: Thermally Stable Diamond Drill Bit Cutters," Drilling Systems, Summer 2004 (pp. 5-9).
Suryanarayana, C., "Novel Methods of Brazing Dissimilar Materials," Advanced Materials & Processes, Mar. 2001 (3 pgs).
Timoshenko, S.P. & Goodler, J.N., "Theory of Elasticity", McGraw-Hill Classic Textbook Reissue 1934, pp. 8-11, 456-458.
Tomlinson, P.N. et al. "Syndax3 Pins—New Concepts in PCD Drilling," Rock Drilling, IDR Mar. 1992, (pp. 109-114).
Ueda, Fumihiro, "Cutting performance of sintered diamond with MgCO3 as a sintering agent," Materials Science and Engineering, 1996 (pp. 260-263).
U.S. Appl. No. 11/545,929, Mail Date Aug. 13, 2008, Office Action.
U.S. Appl. No. 11/545,929, Mail Date Jan. 21, 2009, Office Action.
U.S. Appl. No. 11/545,929, Mail Date Aug. 27, 2009, Office Action.
U.S. Appl. No. 11/545,929, Mail Date Apr. 15, 2010, Office Action.
U.S. Appl. No. 11/545,929, Mail Date Jul. 21, 2010, Office Action.
Orwa, J.O., et al., "Diamond nanocrystals formed by direct implantation of fused silica with carbon," Journal of Applied Physics, vol. 90, No. 6, Jun. 2001, pp. 3007-3018.

* cited by examiner

POLYCRYSTALLINE DIAMOND COMPACT, METHODS OF FABRICATING SAME, AND APPLICATIONS THEREFOR

CROSS-REFERENCE TO RELATED APPLICATIONS

This application claims the benefit of U.S. Provisional Application No. 61/068,120 filed on 3 Mar. 2008, the disclosure of which is incorporated herein, in its entirety, by this reference.

BACKGROUND

Wear-resistant, polycrystalline diamond compacts ("PDCs") are utilized in a variety of mechanical applications. For example, PDCs are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller-cone drill bits and fixed-cutter drill bits. A PDC cutting element typically includes a superabrasive diamond layer commonly known as a diamond table. The diamond table is formed and bonded to a substrate using a high-pressure/high-temperature ("HPHT") process. The PDC cutting element may be brazed directly into a preformed pocket, socket, or other receptacle formed in a bit body. The substrate may often be brazed or otherwise joined to an attachment member, such as a cylindrical backing. A rotary drill bit typically includes a number of PDC cutting elements affixed to the bit body. It is also known that a stud carrying the PDC may be used as a PDC cutting element when mounted to a bit body of a rotary drill bit by press-fitting, brazing, or otherwise securing the stud into a receptacle formed in the bit body.

Conventional PDCs are normally fabricated by placing a cemented-carbide substrate into a container with a volume of diamond particles positioned on a surface of the cemented-carbide substrate. A number of such containers may be loaded into an HPHT press. The substrate(s) and volume(s) of diamond particles are then processed under HPHT conditions in the presence of a catalyst material that causes the diamond particles to bond to one another to form a matrix of bonded diamond grains defining a polycrystalline diamond ("PCD") table. The catalyst material is often a metal-solvent catalyst (e.g., cobalt, nickel, iron, or alloys thereof) that is used for promoting intergrowth of the diamond particles.

In one conventional approach, a constituent of the cemented-carbide substrate, such as cobalt from a cobalt-cemented tungsten carbide substrate, liquefies and sweeps from a region adjacent to the volume of diamond particles into interstitial regions between the diamond particles during the HPHT process. The cobalt acts as a catalyst to promote intergrowth between the diamond particles, which results in formation of a matrix of bonded diamond grains having diamond-to-diamond bonding therebetween, with interstitial regions between the bonded diamond grains being occupied by the solvent catalyst.

The presence of the solvent catalyst in the PCD table is believed to reduce the thermal stability of the PCD table at elevated temperatures. For example, the difference in thermal expansion coefficient between the diamond grains and the solvent catalyst is believed to lead to chipping or cracking of the PCD table during drilling or cutting operations, which consequently can degrade the mechanical properties of the PCD table or cause failure. Additionally, some of the diamond grains can undergo a chemical breakdown or back-conversion to graphite via interaction with the solvent catalyst. At elevated high temperatures, portions of the diamond grains may transform to carbon monoxide, carbon dioxide, graphite, or combinations thereof, causing degradation of the mechanical properties of the PCD table.

One conventional approach for improving the thermal stability of PDCs is to at least partially remove the solvent catalyst from the PCD table of the PDC by acid leaching. In another conventional approach for forming a PDC, a sintered PCD table may be separately formed and then leached to remove the solvent catalyst from interstitial regions between bonded diamond grains. The leached PCD table may be simultaneously HPHT bonded to a cemented-carbide substrate and infiltrated with silicon in a separate HPHT process. The silicon may infiltrate the interstitial regions of the leached PCD table from which the solvent catalyst has been leached and react with the diamond grains to form silicon carbide.

Despite the availability of a number of different PDCs, manufacturers and users of PDCs continue to seek PDCs that exhibit improved toughness, wear resistance, and/or thermal stability.

SUMMARY

Embodiments of the invention relate to PDCs comprising a PCD table including a catalyst material therein that has been at least saturated with one or more chemical elements and/or infiltrated from a host material implanted with carbon ions. In an embodiment, a PDC comprises a substrate and a PCD table bonded to the substrate. The PCD table includes a plurality of bonded diamond grains defining a plurality of interstitial regions. The PCD table includes an upper surface from which a region inwardly extends. At least a portion of the interstitial regions of the region includes a catalyst material disposed therein. At least a portion of the catalyst material may be at least saturated with carbon.

In an embodiment, a method includes providing a PDC comprising a PCD table including a plurality of bonded diamond grains defining a plurality of interstitial regions including a catalyst material disposed therein. The method further includes at least saturating at least a portion of the catalyst material in a region of the PCD table.

In an embodiment, a method of fabricating a PDC and a PDC formed by such an inventive method is disclosed. The method includes implanting carbon ions into a host material. The method further includes sintering a plurality of diamond particles in the presence of the implanted host material to form a PCD table.

In an embodiment, a method of fabricating a PDC includes implanting carbon ions into a cementing constituent of a region of a cemented carbide substrate. The method also includes positioning an at least partially leached PCD table adjacent to the region of the cemented carbide substrate implanted with the carbon ions to form an assembly. The method further includes subjecting the assembly to an HPHT process. The method also includes at least partially infiltrating the at least partially leached PCD table with at least some of the cementing constituent of the region of the cemented carbide substrate, in response to the HPHT process, to form an at least partially infiltrated PCD table.

Other embodiments include applications utilizing the disclosed PDCs in various articles and apparatuses, such as rotary drill bits, machining equipment, and other articles and apparatuses.

BRIEF DESCRIPTION OF THE DRAWINGS

The drawings illustrate several embodiments of the invention, wherein identical reference numerals refer to identical elements or features in different views or embodiments shown in the drawings.

DETAILED DESCRIPTION

Embodiments of the invention relate to PDCs comprising a PCD table including a catalyst material therein that has been at least saturated with one or more chemical elements (e.g., carbon, boron, phosphorous, and/or nitrogen) and/or infiltrated from a host material implanted with carbon ions. The disclosed PDCs herein may be used in a variety of applications, such as rotary drill bits, mining tools, drill bits, bearing apparatuses, wire-drawing dies, machining equipment, and other articles and apparatuses.

Figure 1A:
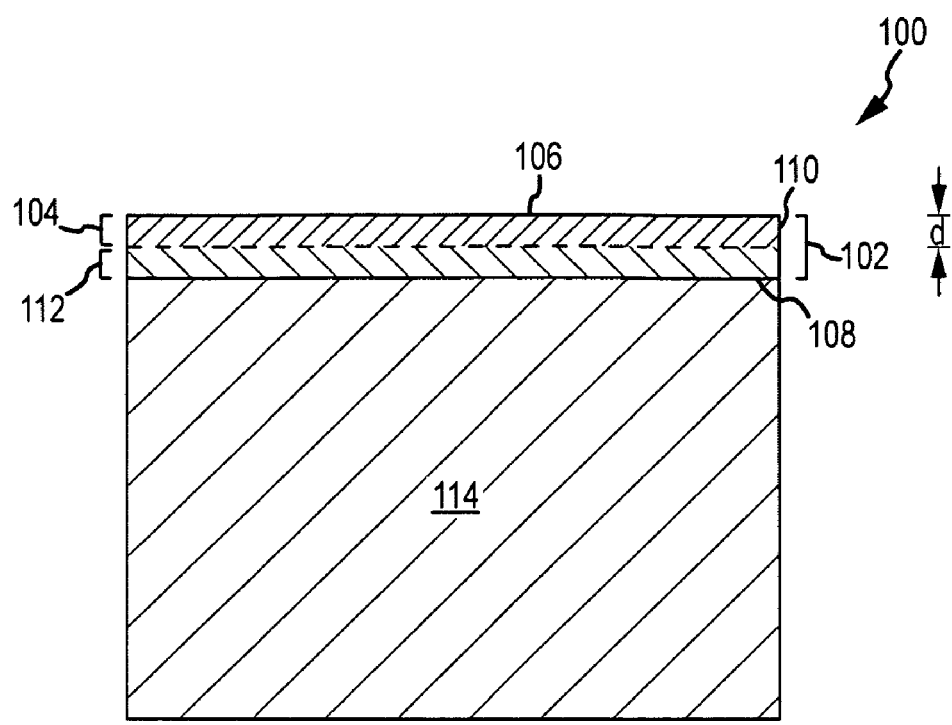
FIG. 1A is a cross-sectional view of an embodiment of a PDC that comprises a PCD table including a region in which a catalyst material thereof is at least saturated with carbon.

FIG. 1A is a cross-sectional view of an embodiment of a PDC 100 that comprises a PCD table 102 including a first region 104 in which a catalyst material thereof is at least saturated with carbon to improve the thermal stability of the PCD table 102. The PCD table 102 includes a working upper surface 106, a back surface 108, and at least one lateral surface 110 extending therebetween. Although the upper surface 106 is illustrated as being substantially planar, the upper surface 106 may have a nonplanar geometry, such as a convex or concave geometry. Furthermore, the PCD table 102 may include a chamfer that extends about the upper surface 106. Additionally, other regions of the PCD table 102 may also function as a working region, such as the at least one lateral surface 110.

The PCD table 102 includes directly bonded-together diamond grains exhibiting diamond-to-diamond bonding therebetween. The plurality of bonded diamond grains defines a plurality of interstitial regions that includes a catalyst material disposed therein, such as iron, nickel, cobalt, or alloys thereof. The first region 104 of the PCD table 102 extends from the upper surface 106 to an intermediate depth d, and a second region 112 extends from the back surface 106 inwardly to the first region 104. The depth d to which the first region 104 extends from the upper surface 106 may be about 1 nm to about 1500 nm, such as about 50 nm to about 800 nm or about 300 nm to about 800 nm.

The catalyst material located in the interstitial regions of the first region 104 may be at least saturated with carbon and, in some embodiments, supersaturated with carbon at standard temperature and pressure (i.e., 0° C. and 1 atmosphere) or above. For example, in an embodiment, the catalyst material at and/or near the upper surface 106 may be supersaturated, while deeper regions of the first region 104 may only be saturated. In an embodiment, the catalyst material located in the interstitial regions of the first region 104 may be at least saturated with carbon and, in some embodiments, supersaturated with carbon for temperature and pressure conditions typically experienced during subterranean drilling operations. In some embodiments, the catalyst material in the first region 104 may include carbon fibrules therein, characteristic of the catalyst material being at least saturated with carbon. Because the catalyst material in the first region 104 is at least saturated with carbon, the catalyst material has less of a tendency to dissolve carbon therein. Therefore, at elevated temperatures commonly experienced during drilling (e.g., about 700° C. to about 900° C.) when the PDC 100 is employed as a cutting element of a rotary drill bit, the catalyst material in the first region 104 does not significantly catalyze back conversion of the diamond grains to graphite and/or another by-product. For example, it is currently believed by the inventor that absent the catalyst material being at least saturated with carbon, carbon from the diamond grains may be dissolved in the catalyst material and precipitated as graphite under the non-diamond stable conditions typically experienced during drilling operations.

The interstitial regions of the second region 112 also includes the catalyst material disposed therein. However, the catalyst material in the second region 112 may not be saturated with carbon. Instead, the catalyst material in the second region may include carbon in an amount less than the solubility limit for carbon in the catalyst material at room temperature and standard pressure. Accordingly, the first region 104 exhibits a thermally stability and/or wear resistance that is greater than that of the second region 112 of the PCD table 102 due to the increased carbon content in the catalyst material of the first region 104.

The PDC 100 further includes a substrate 114 (having any suitable geometry) bonded to the back surface 108 of the PCD table 102. Suitable materials for the substrate 114 include cemented carbides, such as titanium carbide, niobium carbide, tantalum carbide, vanadium carbide, tungsten carbide, or combinations of any of the preceding carbides cemented with iron, nickel, cobalt, or alloys thereof. In an embodiment, the substrate 114 may comprise cobalt-cemented tungsten carbide. Although the interfacial surface of the substrate 114 is illustrated as being substantially planar, the interfacial surface may exhibit a selected nonplanar geometry and the back surface 108 of the PCD table 102 may exhibit a correspondingly configured geometry.

Figure 1B:
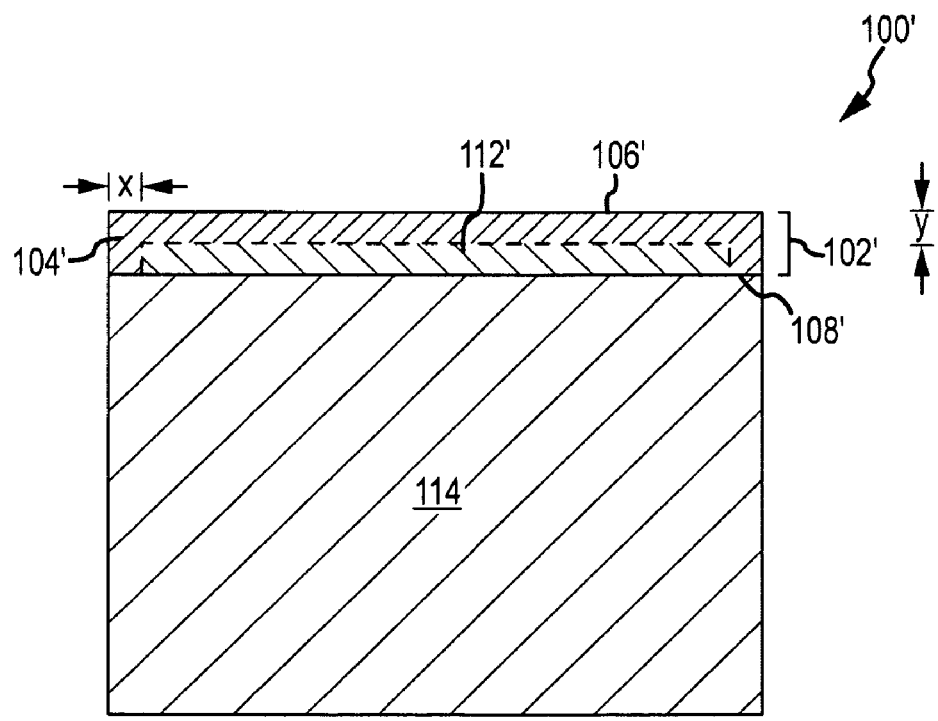
FIG. 1B is a cross-sectional view of an embodiment of a PDC that comprises a PCD table including a region in which a catalyst material thereof is at least saturated with carbon, and the region extends laterally to a distance that is about equal to a depth that the region extends from an upper surface of the PCD table.

FIG. 1B is a cross-sectional view of an embodiment of a PDC 100'. The PDC 100' comprises a PCD table 102' that includes an upper surface 106' and a back surface 108' bonded to the substrate 114. The PCD table 102' further includes a region 104' in which the catalyst material thereof is at least saturated with carbon (e.g., saturated or supersaturated), and a second region 112' in which the catalyst material thereof is not saturated with carbon. The first region 104' extends laterally to a distance X that is about equal to a depth Y that the first region 104' extends from the upper surface 106' of the PCD table 102'. For example, the distances X and Y may each be about 1 nm to about 1500 nm, such as about 50 nm to about 800 nm or about 300 nm to about 800 nm.

Figure 2:
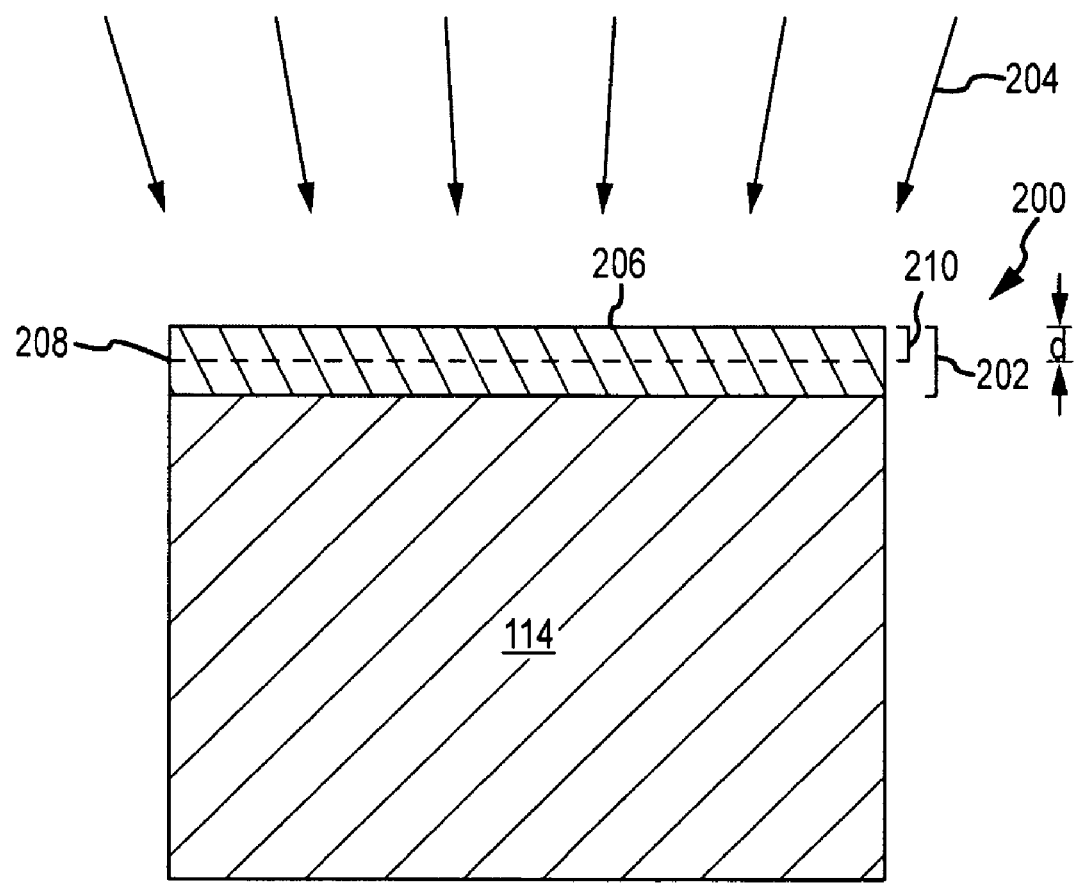
FIG. 2 is a schematic cross-sectional view of a PDC including a PCD table being implanted with carbon ions to form the PDCs shown in FIGS. 1A and 1B according to an embodiment of a method.

FIG. 2 is a schematic cross-sectional view of a PDC 200 including a PCD table 202 being implanted with carbon ions to form the PDCs 100 and 100' shown in FIGS. 1A and 1B according to an embodiment of a method. The PCD table 202 includes a plurality of directly bonded-together diamond grains defining a plurality of interstitial regions. However, the plurality of interstitial regions includes a catalyst material disposed therein that is not saturated with carbon. In accordance with an embodiment of a method, the PDC 200 may be positioned in a chamber of an ion-implantation apparatus that includes a carbon-ion source. A plurality of carbon ions 204 may be directed at the PCD table 202. For example, the carbon ions 204 may be directed at an upper surface 206 and/or at least one lateral surface 208 of the PCD table 202 so that carbon ions are implanted into the catalyst material of the PCD table 202. The dose and implantation energy of the carbon ions 204 implanted into the PCD table 202 may be sufficient to at least saturate at least a portion of the catalyst material therein with carbon ions in an implantation region 210 that extends to a depth d from the upper surface 206. For example, substantially all or a portion of the catalyst material in the implantation region 210 may be at least saturated with carbon ions. The depth d to which the implantation region 210 extends from the upper surface 206 may be about 1 nm to about 1500 nm, such as about 50 nm to about 800 nm or about 300 nm to about 800 nm. In some embodiments, the dose of the carbon ions 204 may be sufficient to supersaturate at least a portion of the catalyst material in the implantation region 210. By directing the carbon ions 204 at the upper surface 206 and the at least one lateral surface 208 with the same energy and dose, the implantation region may exhibit the structure of the region 104' shown in FIG. 1B.

In some embodiments, the PCD table 202 may include a chamfer or other edge geometry, and the implantation region 210 may extend inwardly from such a chamfer. In another embodiment, a chamfer or other edge geometry may be formed in the PCD table after implantation with the carbon ions 204. For example, the chamfer may be formed by grinding, lapping, electro-discharge machining, or combinations of the foregoing.

In an embodiment, a plasma that includes carbon ions 204 may be generated from a carbon-containing gas using electron cyclotron resonance ("ECR"), a large-area pulsed radio frequency, or another suitable technique. For example, the carbon ions 204 may be generated by discharge of a carbon-containing gas, such as carbon monoxide, carbon dioxide, methane, another type of hydrocarbon gas, or mixtures of the foregoing; or sputter erosion of carbon electrode using a plasma, such as an argon plasma. The carbon ions 204 may be accelerated at the PCD table 202 using a high-voltage source so that the carbon ions 204 become embedded in the PCD table 202 to form the implantation region 210 therein. For example, the carbon ions 204 may be accelerated at the PCD table 202 with an energy of about 2 keV to about 50 keV. In some embodiments, the carbon ions 204 may be in the form of a high-energy beam of carbon ions that may be directed at the PCD table 202. For example, the high-energy beam of carbon ions may exhibit an energy of about 70 keV to about 100 keV. The dose of the carbon ions 204 implanted into the PCD table 202 may be about $10^{15}$ ions per $cm^2$ to about $10^{18}$ ions per $cm^2$, such as about $10^{16}$ ions per $cm^2$ to about $10^{17}$ ions per $cm^2$.

In an embodiment, the carbon-ion-implantation process may be performed at room temperature and ambient pressure. In other embodiments, the carbon-ion-implantation process may be performed with the PCD table 202 and the catalyst material therein being at an elevated temperature at which carbon has a higher solubility in the catalyst material, such as about 500° C. to about 1000° C.

In an embodiment, the PDC 200 may be annealed at a suitable temperature to cause the carbon ions implanted into the implantation region 210 of the PCD table 202 to diffuse deeper into the PCD table 202. At least the PCD table 202 of the PDC 200 may be exposed to a temperature of about 100° C. to about 1000° C. in air or a protected atmosphere (e.g., a vacuum or inert-gas shielded environment). For example, the temperature at which the PCD table 202 may be exposed to may be about 300° C. to about 500° C.

Other chemical elements may be implanted into the catalyst material of the PCD table 202 as an alternative to or in addition to carbon ions to improve the thermal stability and/or wear resistance of the PCD table 202. For example, in an embodiment, boron ions, nitrogen ions, phosphorous ions, or combinations thereof may be implanted into the catalyst material of the PCD table 202 to at least saturate and, in some embodiments, supersaturate the catalyst material.

Figure 3A:
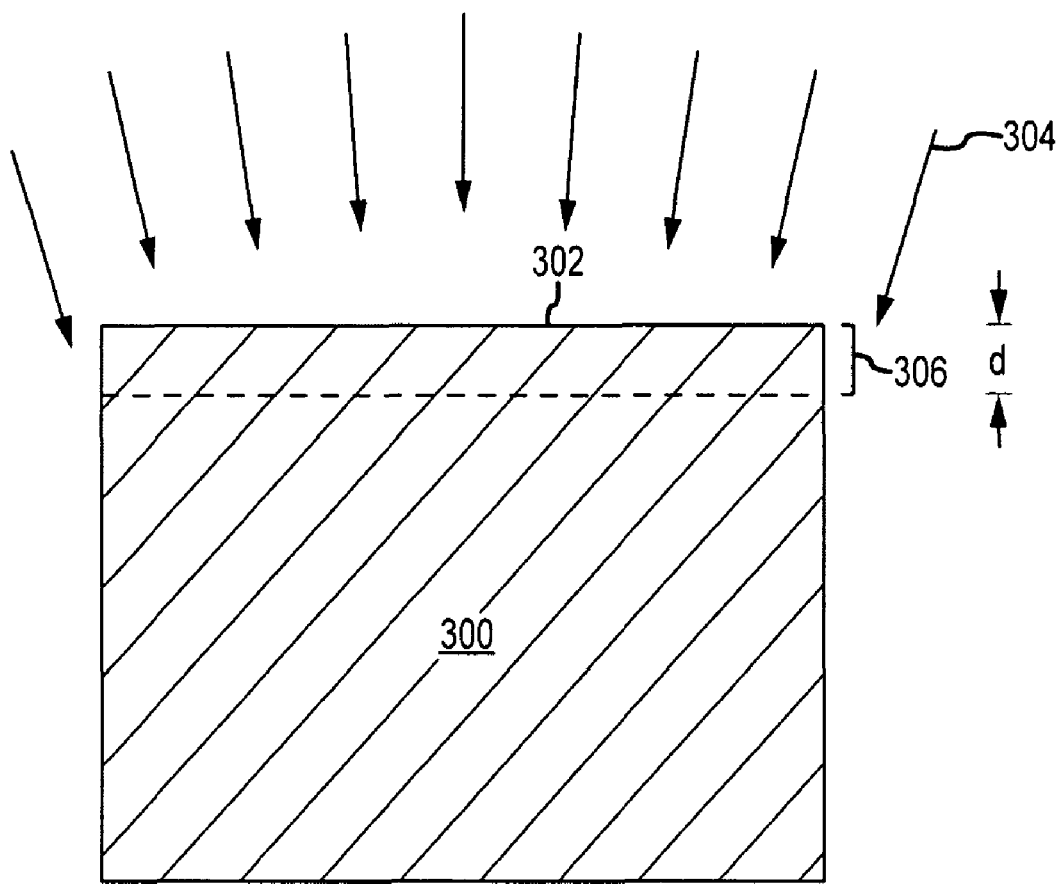
FIGS. 3A-3C are cross-sectional views illustrating various stages in an embodiment of a method of fabricating a PDC that includes forming a PCD table on a substrate that has been implanted with carbon ions.
Figure 3B:
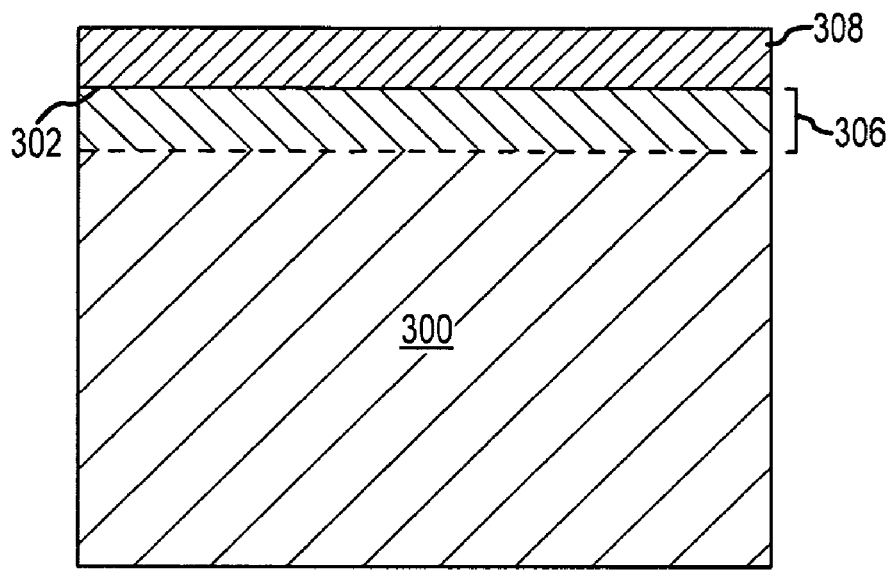
Figure 3C:
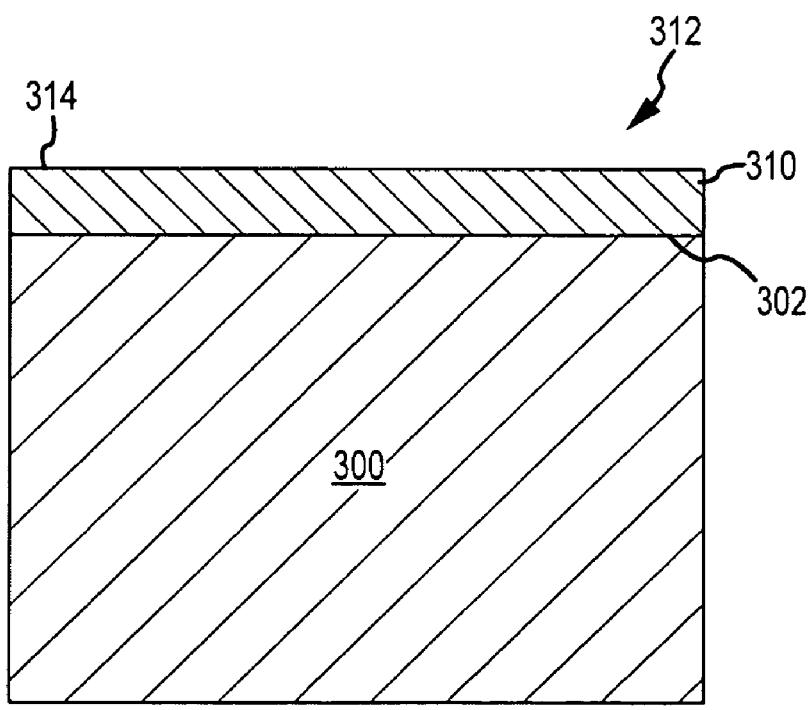

FIGS. 3A-3C are cross-sectional views illustrating various stages in an embodiment of a method of fabricating a PDC that includes implanting a host material with carbon ions and sintering a plurality of diamond particles in the presence of the implanted host material to form a PCD table. For example, the host material may comprise a cemented-carbide substrate, a plurality of catalyst particles, a layer of catalyst material, a refractory metal or alloy, another metal or alloy (e.g., aluminum, copper, or alloys thereof), or another suitable host material.

Referring to FIG. 3A, a substrate 300 may be disposed in an ion-implantation chamber. Suitable materials for the substrate 300 include cemented carbides, such as titanium carbide, niobium carbide, tantalum carbide, vanadium carbide, tungsten carbide, or combinations of any of the preceding carbides cemented with a cementing constituent, such as iron, nickel, cobalt, alloys thereof, metal-solvent catalyst, or another material capable of hosting implanted carbon ions. In an embodiment, the substrate 300 may comprise cobalt-cemented tungsten carbide. Although an interfacial surface 302 of the substrate 300 is illustrated as being substantially planar, the interfacial surface may exhibit a selected nonplanar geometry.

Still referring to FIG. 3A, a plurality of carbon ions 304 may be directed at interfacial surface 302 of the substrate 300 using any of the disclosed carbon-ion-implantation processes. The dose and implantation energy of the carbon ions 304 implanted into the substrate 300 may be sufficient to at least saturate the cementing constituent therein in an implantation region 306 that extends to a depth d from the interfacial surface 302. The depth d to which the implantation region 306 extends from interfacial surface 302 may be about 1 nm to about 1500 nm, such as about 50 nm to about 800 nm or about 300 nm to about 800 nm. In an embodiment, the dose of the carbon ions 304 may be sufficient to supersaturate at least a portion of the cementing constituent in the implantation region 306. In some embodiments, the cementing constituent in the implantation region 306 may include carbon fibrules therein characteristic of the cementing constituent being at least saturated with carbon.

In one embodiment, the substrate 300 including the implanted carbon ions therein may be tested to determine the carbon content in and the depth of the implantation region 306. For example, mass spectroscopy, Rutherford Backscattering Spectrometry, or another suitable analytical technique may be used to measure the carbon content in the implantation region 306.

Referring to FIG. 3B, one or more layers of diamond particles 308 may be positioned adjacent to the interfacial surface 302 of the substrate 300. The plurality of diamond particles of the one or more layers of diamond particles 308 may exhibit one or more selected sizes. The one or more selected sizes may be determined, for example, by passing the diamond particles through one or more sizing sieves or by any other method. In an embodiment, the plurality of diamond particles may include a relatively larger size and at least one relatively smaller size. As used herein, the phrases "relatively larger" and "relatively smaller" refer to particle sizes determined by any suitable method, which differ by at least a factor of two (e.g., 40 μm and 20 μm). More particularly, in various embodiments, the plurality of diamond particles may include a portion exhibiting a relatively larger size (e.g., 100 μm, 90 μm, 80 μm, 70 μm, 60 μm, 50 μm, 40 μm, 30 μm, 20 μm, 15 μm, 12 μm, 10 μm, 8 μm) and another portion exhibiting at least one relatively smaller size (e.g., 30 μm, 20 μm, 10 μm, 15 μm, 12 μm, 10 μm, 8 μm, 4 μm, 2 μm, 1 μm, 0.5 μm, less than 0.5 μm, 0.1 μm, less than 0.1 μm). In an embodiment, the plurality of diamond particles may include a portion exhibiting a relatively larger size between about 40 μm and about 15 μm and another portion exhibiting a relatively smaller size between about 12 μm and 2 μm. Of course, the plurality of diamond particles may also include three or more different sizes (e.g., one relatively larger size and two or more relatively smaller sizes) without limitation.

The substrate 300 and the one or more layers of diamond particles 308 may be placed in a pressure transmitting medium, such as a refractory metal can embedded in pyrophyllite or other gasket medium. The pressure transmitting medium, including the substrate 300 and diamond particles therein, may be subjected to an HPHT process using an ultra-high pressure press to create temperature and pressure conditions at which diamond is stable. The temperature of the HPHT process may be at least about 1000° C. (e.g., about 1200° C. to about 1600° C.) and the pressure of the HPHT process may be at least 4.0 GPa (e.g., about 5.0 GPa to about 8.0 GPa) for a time sufficient to sinter the diamond particles to form the PCD table 202. For example, the pressure of the HPHT process may be about 5 GPa to about 7 GPa and the temperature of the HPHT process may be about 1150° C. to about 1450° C. (e.g., about 1200° C. to about 1400° C.).

During the HPHT process, the cementing constituent from the substrate 300 may be liquefied and may infiltrate into the diamond particles of the one or more layers of diamond particles 308. In particular, the cementing constituent that is at least saturated with carbon in the implantation region 306 at least partially liquefies and infiltrates the diamond particles of the one or more layers of diamond particles 308.

Referring to FIG. 3C, the infiltrated cementing constituent functions as a catalyst that catalyzes formation of directly bonded-together diamond grains to form a PCD table 310. Upon cooling from the HPHT process, the PCD table 310 becomes metallurgically bonded to the substrate 300 to form a PDC 312. The PCD table 310 includes a plurality of directly bonded-together diamond grains defining a plurality of interstitial regions having the infiltrated cementing constituent disposed therein. Because the infiltrated cementing constituent from the implantation region 306 (FIG. 3B) is at least saturated with carbon, the PCD table 310 so-formed may exhibit increased diamond-to-diamond bonding between the diamond grains thereof compared to if the cementing constituent was not saturated with carbon and the same HPHT processing conditions were used.

In some embodiments, at least some of the carbon ions 304 implanted into the substrate 300 may be identifiable and detectable in the PCD table 308 from other sources of carbon. For example, when the carbon ions 304 are an isotope of carbon other than carbon-12, the presence of the carbon ions 304 may be detectable in the cementing constituent of the PCD table 308 after HPHT processing. In some embodiments, a region of the substrate 300 adjacent to the PCD table 308 may exhibit a greater carbon concentration that a region of the substrate 300 that was not within the implantation region 306 before HPHT processing.

In an embodiment, at least a portion of the cementing constituent may be removed from the PCD table 310 to form a leached region using a leaching process in an acid, such as aqua regia, nitric acid, hydrofluoric acid, or other suitable acid. For example, the leached region may extend inwardly from an upper surface 314 to a selected depth (e.g., about 50 μm to about 1000 μm) within the PCD table 310.

In another embodiment, the PCD table 310 may be implanted with carbon ions, nitrogen ions, phosphorous ions and/or boron ions, as previously described, to at least saturate the cementing constituent present therein with one or more of such chemical elements. In a further embodiment, the PCD table 310 may be implanted with carbon ions, nitrogen ions, phosphorous ions and/or boron ions after leaching the PCD table 310 so that the residual cementing constituent that was not leached from the PCD table 310 or the cementing constituent located below the leached region may be at least saturated with one or more of such chemical elements, which may improve the thermal stability of the PCD table 310.

Although the illustrated embodiment shown in FIGS. 3A-3C depicts implanting carbon ions into a cementing constituent of a substrate, in other embodiments, a plurality of catalyst particles may be implanted with carbon ions. For example, a plurality of catalyst particles (e.g., particles of iron, nickel, cobalt, or alloys thereof) may be implanted with carbon ions and mixed with the plurality of diamond particles of the one or more layers of diamond particles 308, positioned between the substrate 300 and the plurality of diamond particles, or combinations of the foregoing. In another embodiment, a catalyst-material substrate (e.g., a disc of catalyst material) may be implanted with carbon ions, disposed between the substrate 300 and one or more layers of diamond particles 308, and the implanted catalyst material may be infiltrated into the one or more layers of diamond particles 308. In a further embodiment, any material capable of being implanted with carbon ions may be employed as a carrier for the carbon ions. For example, a disc of aluminum, copper, or alloys thereof may be implanted carbon ions.

Figure 4A:
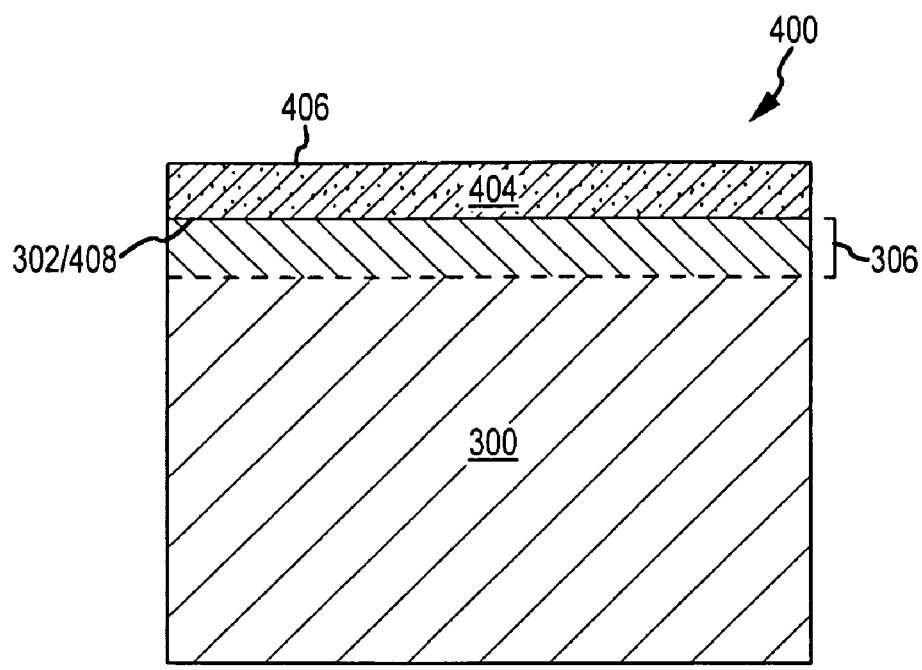
FIGS. 4A and 4B are cross-sectional views illustrating various stages in an embodiment of a method of fabricating a PDC that includes infiltrating an at least partially leached PCD table with a carbon-ion-implanted cementing constituent from a substrate.
Figure 4B:
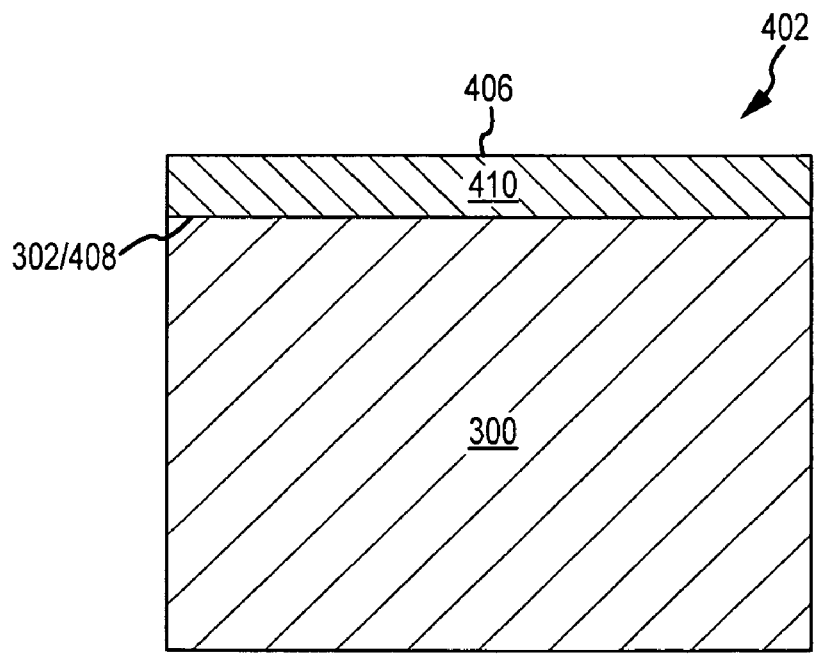

FIG. 4A is a cross-sectional view of an assembly 400 to be HPHT processed and FIG. 4B is a cross-sectional view of a PDC 402 so-formed. Referring to FIG. 4A, an at least partially leached PCD table 404 including an upper surface 406 and a substrate interfacial surface 408 may be provided. The at least partially leached PCD table 404 includes a plurality of directly bonded-together diamond grains defining interstitial regions that form a network of at least partially interconnected pores that enable fluid to flow from the substrate interfacial surface 408 to the upper surface 406. The at least partially leached PCD table 404 may be positioned adjacent to the implantation region 306, including the substrate interfacial surface 408, of the substrate 300 to form the assembly 400.

The assembly 400 may be placed in a pressure transmitting medium, such as a refractory metal can embedded in pyrophyllite or other gasket medium. The pressure transmitting medium, including the assembly 400, may be subjected to an HPHT process using an ultra-high pressure press to create temperature and pressure conditions at which diamond is stable. The temperature of the HPHT process may be at least about 1000° C. (e.g., about 1200° C. to about 1600° C.) and the pressure of the HPHT process may be at least 4.0 GPa (e.g., about 5.0 GPa to about 8.0 GPa) so that at least a portion of the cementing constituent in the substrate 300 may be liquefied and may infiltrate into the at least partially leached PCD table 404. For example, the pressure of the HPHT process may be about 5 GPa to about 7 GPa and the temperature of the HPHT process may be about 1150° C. to about 1450° C. (e.g., about 1200° C. to about 1400° C.). Upon cooling from the HPHT process, the infiltrated PCD table represented as pre-sintered PCD table 410 in FIG. 4B becomes bonded to the substrate 300.

During the HPHT process, cementing constituent from the implanted region 306 of the substrate 300 that has been at least saturated with carbon may at least partially melt and infiltrate into the at least partially leached PCD table 404. Due to the additional carbon swept-in from the implantation region 306, additional diamond may be grown between existing diamond grains of the at least partially leached PCD table so that the diamond-to-diamond bond density increases. The increased diamond-to-diamond bond density present in the pre-sintered PCD table 410 may increase the wear resistance and/or thermal stability thereof compared to if the substrate 300 had not been implanted with carbon ions.

The at least partially leached PCD table 404 may be fabricated by subjecting a plurality of diamond particles, exhibiting any of the disclosed particle size distributions, to an HPHT sintering process in the presence of a metal-solvent catalyst (e.g., cobalt, nickel, iron, or alloys thereof) to facilitate intergrowth between the diamond particles and form a PCD body comprised of bonded diamond grains that exhibit diamond-to-diamond bonding therebetween. For example, the metal-solvent catalyst may be mixed with the diamond particles, infiltrated from a metal-solvent catalyst foil or powder adjacent to the diamond particles, infiltrated from a metal-solvent catalyst present in a cemented-carbide substrate, or combinations of the foregoing. The bonded diamond grains, so-formed by HPHT sintering the diamond particles, define interstitial regions with the metal-solvent catalyst disposed within the interstitial regions. The diamond particles may exhibit a single-mode diamond particle size distribution, or a bimodal or greater diamond particle size distribution.

The as-sintered PCD body may be leached by immersion in an acid, such as aqua regia, nitric acid, hydrofluoric acid, or subjected to another suitable process to remove at least a portion of the metal-solvent catalyst from the interstitial regions of the PCD body and form the at least partially leached PCD table 404. For example, the as-sintered PCD body may be immersed in the acid for about 2 to about 7 days (e.g., about 3, 5, or 7 days) or for a few weeks (e.g., about 4 weeks) depending on the process employed. It is noted that when the metal-solvent catalyst is infiltrated into the diamond particles from a cemented tungsten carbide substrate including tungsten carbide particles cemented with a metal-solvent catalyst (e.g., cobalt, nickel, iron, or alloys thereof), the infiltrated metal-solvent catalyst may carry tungsten and/or tungsten carbide therewith and the as-sintered PCD body may include such tungsten and/or tungsten carbide therein disposed interstitially between the bonded diamond grains. The tungsten and/or tungsten carbide may not be substantially removed by the leaching process and may enhance the wear resistance of the at least partially leached PCD table 404.

The at least partially leached PCD table 404 may be subjected to a shaping process prior to bonding to the substrate 300 (e.g., grinding or lapping) to tailor the geometry thereof, as desired, for a particular application. The as-sintered PCD body may also be shaped prior to leaching or bonding to the substrate 300 by a machining process, such as electro-discharge machining. For example, the at least partially leached PCD table 404 may be chamfered prior to or after being bonded to the substrate 300.

In an embodiment, prior to infiltrating and bonding the at least partially leached PCD table 404 to the substrate 300 in an HPHT process, the at least partially leached PCD table 404 may be cleaned to remove leaching by-products generated during the leaching process. Suitable cleaning processes for cleaning the at least partially leached PCD table 404 are disclosed in U.S. patent application Ser. No. 12/120,849, the disclosure of which is incorporated herein, in its entirety, by this reference.

Figure 4C:
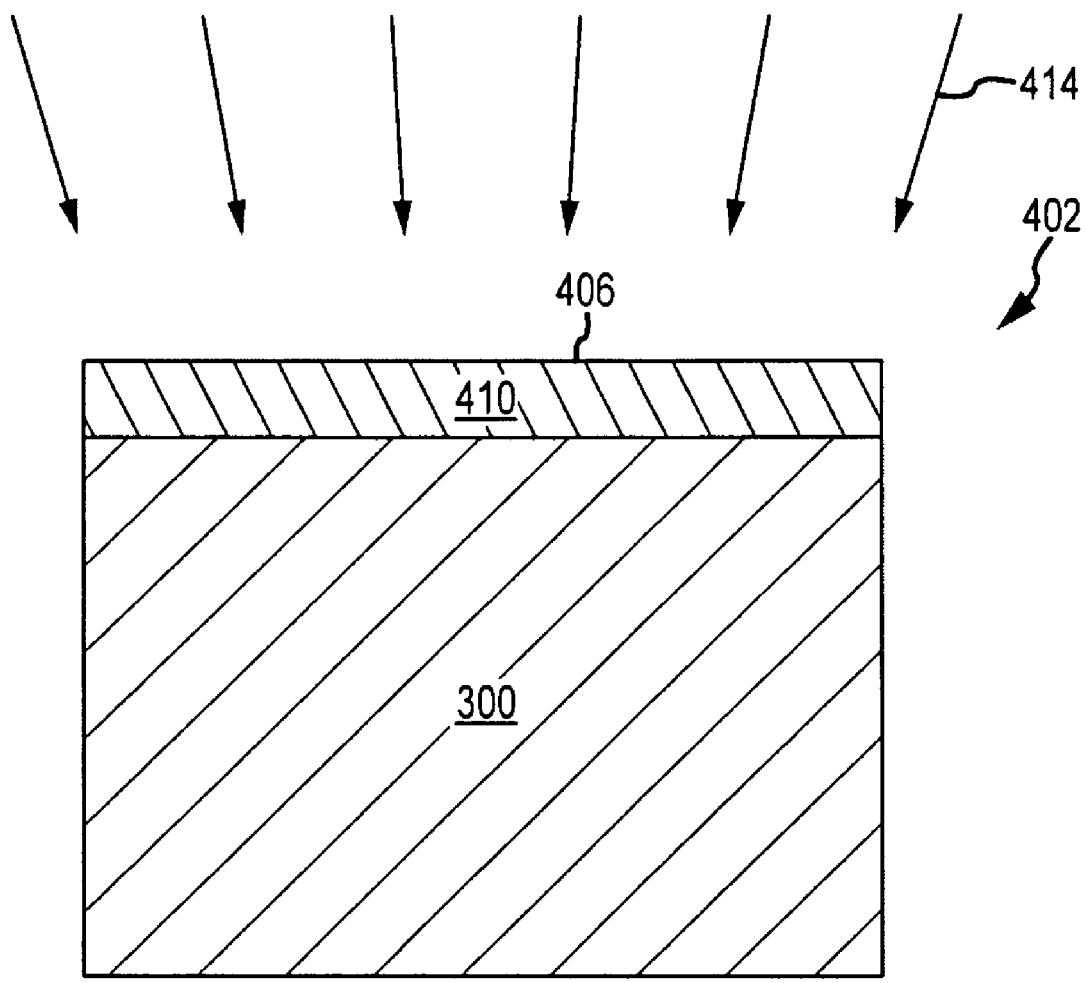
FIGS. 4C and 4D are cross-sectional views illustrating various stages in an embodiment of a method for implanting carbon ions into an infiltrated cementing constituent present in the at least partially leached PCD table shown in FIG. 4B.
Figure 4D:
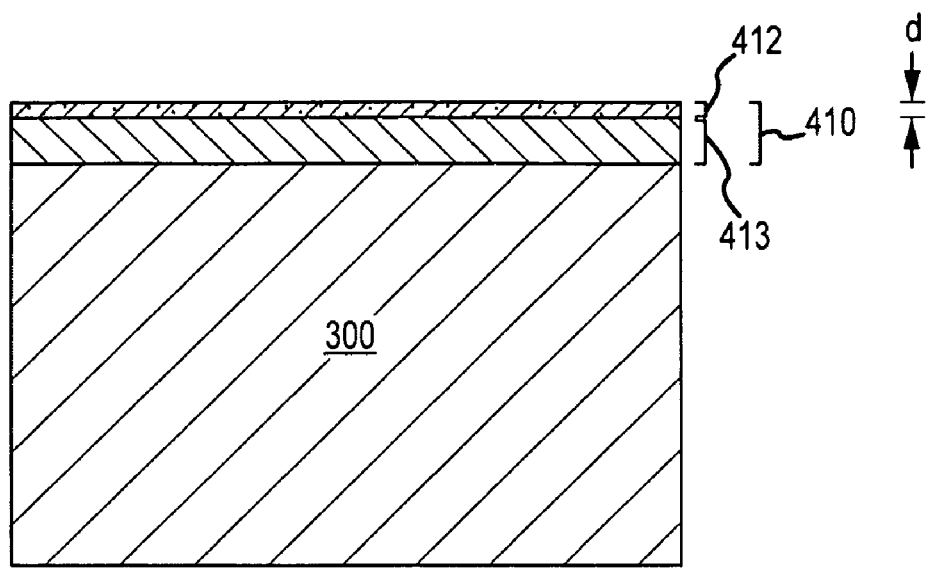

FIGS. 4C and 4D are cross-sectional views illustrating various stages in an embodiment of a method for implanting carbon ions into the infiltrated cementing constituent present in the at least partially leached PCD table 404 shown in FIG. 4B. Referring to FIG. 4C, the PDC 402 may be disposed in an ion-implantation chamber of a carbon-ion-implantation apparatus and carbon ions 414 (generated by any of the disclosed carbon-ion-implantation processes) may be implanted into the infiltrated cementing constituent of the pre-sintered PCD table 410 that was provided from the substrate 300 to form an implantation region 412 (FIG. 4D). The dose and energy of the carbon ions 414 may be sufficient so that the infiltrated cementing constituent within the implantation region 412 may be at least saturated and, in some embodiments, supersaturated with carbon. For example, in some embodiments, the infiltrated cementing constituent may include carbon fibrules therein characteristic of being at least saturated with carbon. The implantation region 412 may extend to a depth d from the upper surface 406, such as about 1 nm to about 1500 nm (e.g., about 50 nm to about 800 nm or about 300 nm to about 800 nm). As a result of the additional carbon in the implantation region 412, the thermal stability and/or wear resistance of the implantation region 412 may be greater than that of a region 413 adjacent to the substrate 300 that is unaffected by the carbon-ion-implantation process. In an embodiment, the carbon ions 414 may also be implanted through a lateral surface of the pre-sintered PCD table 410, in addition to the upper surface 406, to form an implantation region similar in geometry to the implantation region 104' shown in FIG. 1B. Boron ions, nitrogen ions, phosphorous ions, or combinations thereof may be implanted into the infiltrated cementing constituent of the pre-sintered PCD table 410 at least to saturation as an alternative to or in addition to the infiltrated cementing constituent of the implantation region 412 being implanted with carbon ions.

Figure 4E:
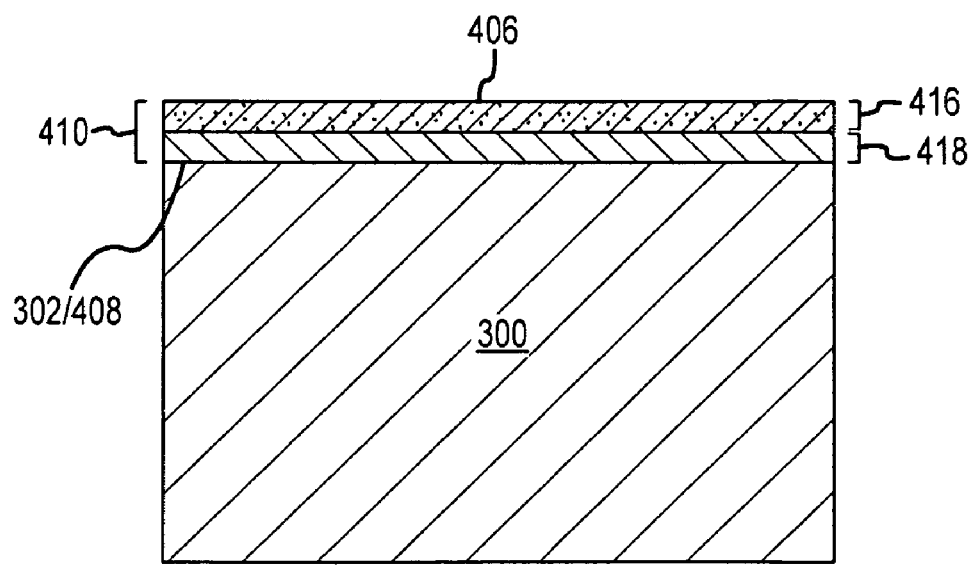
FIG. 4E is a cross-sectional view of the PDC shown in FIG. 4B after at least partially removing an infiltrated cementing constituent from a region of the PCD table.

FIG. 4E is a cross-sectional view of the PDC shown in FIG. 4B after at least partially removing the infiltrated cementing constituent (e.g., a metal-solvent catalyst) from a selected region 416 of the pre-sintered PCD table 410 to improve the thermal stability thereof. In an embodiment of a method, at least a portion of the infiltrated cementing constituent may be removed from the selected region 416 of the pre-sintered PCD table using a leaching process in an acid, such as aqua regia, nitric acid, hydrofluoric acid, or other suitable acid. For example, the selected region 416 may extend inwardly from an upper surface 406 to a selected depth (e.g., about 50 μm to about 1000 μm) within the pre-sintered PCD table 410. In some embodiments, the selected region 416 may extend inwardly from a lateral surface of the pre-sintered PCD table 410. A region 418 adjacent to the substrate 300 may be relatively unaffected by the leaching process.

In another embodiment, the pre-sintered PCD table 410 may be implanted with carbon ions, boron ions, phosphorous ions, and/or nitrogen ions after leaching so that the residual infiltrated cementing constituent present in the selected region 416 that was not leached from the pre-sintered PCD table 310 and/or the infiltrated cementing constituent in the region 418 located below the selected region 416 may be at least saturated with one or more of such chemical elements, which may improve the thermal stability of the pre-sintered PCD table 410.

Figure 5:
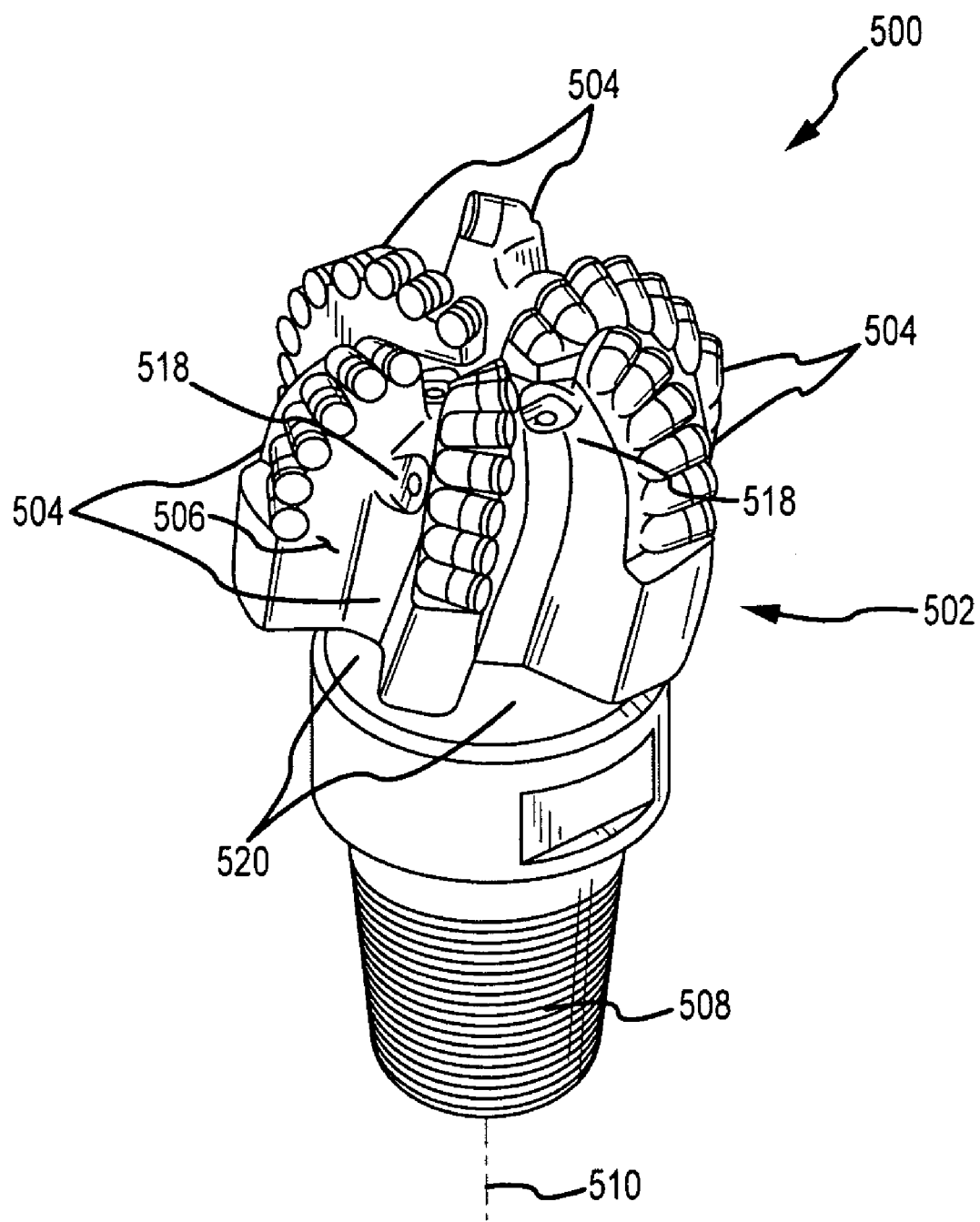
FIG. 5 is an isometric view of an embodiment of a rotary drill bit that may employ one or more of the disclosed PDC embodiments.
Figure 6:
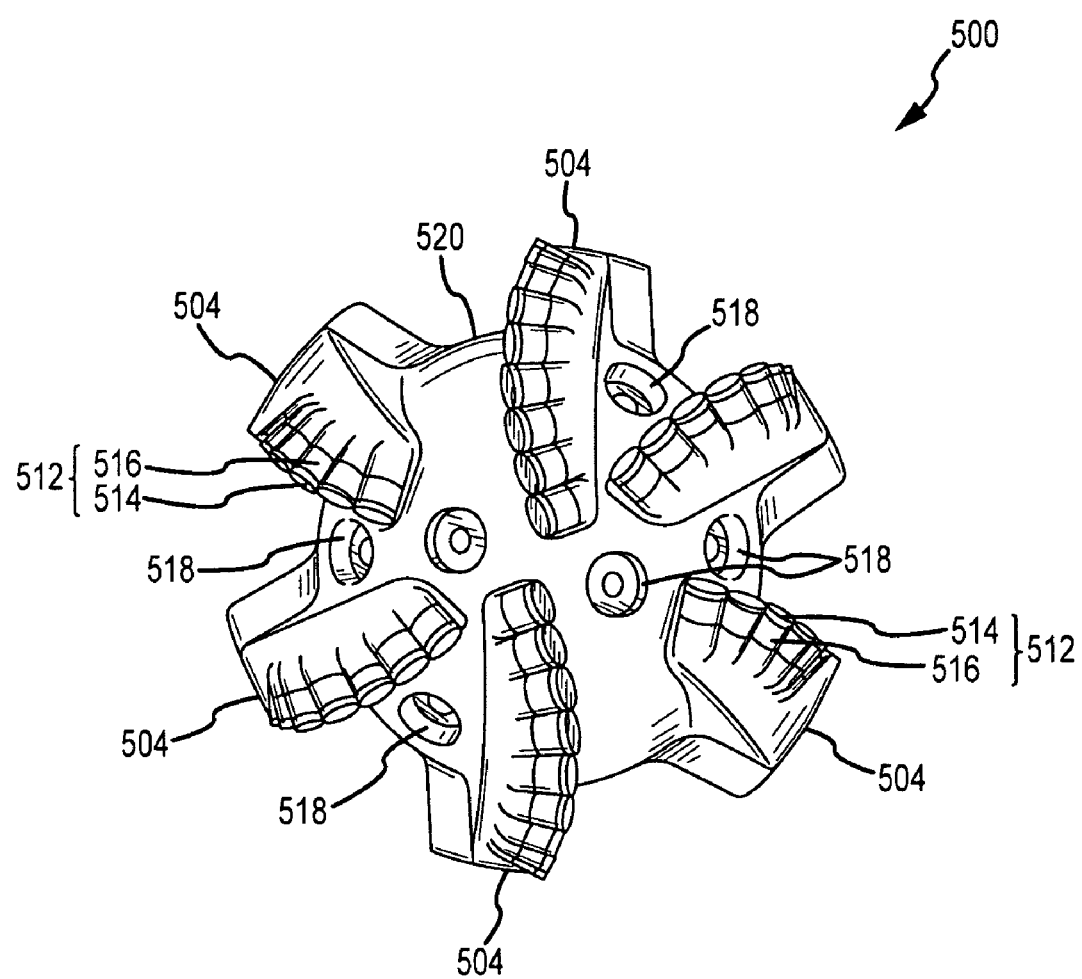
FIG. 6 is a top elevation view of the rotary drill bit shown in FIG. 5.

FIG. 5 is an isometric view and FIG. 6 is a top elevation view of an embodiment of a rotary drill bit 500. The rotary drill bit 500 includes at least one PDC configured according to any of the previously described PDC embodiments, such as the PDC 100 of FIG. 1A. The rotary drill bit 500 comprises a bit body 502 that includes radially and longitudinally extending blades 504 having leading faces 506, and a threaded pin connection 508 for connecting the bit body 502 to a drilling string. The bit body 502 defines a leading end structure for drilling into a subterranean formation by rotation about a longitudinal axis 510 and application of weight-on-bit. At least one PDC, configured according to any of the previously described PDC embodiments, may be affixed to the bit body 502. With reference to FIG. 6, a plurality of PDCs 512 are secured to the blades 504 of the bit body 502 (FIG. 5). For example, each PDC 512 may include a PCD table 514 bonded to a substrate 516. More generally, the PDCs 512 may comprise any PDC disclosed herein, without limitation. In addition, if desired, in some embodiments, a number of the PDCs 512 may be conventional in construction. Also, circumferentially adjacent blades 504 define so-called junk slots 520 therebetween. Additionally, the rotary drill bit 500 includes a plurality of nozzle cavities 518 for communicating drilling fluid from the interior of the rotary drill bit 500 to the PDCs 512.

FIGS. 5 and 6 merely depict one embodiment of a rotary drill bit that employs at least one PDC fabricated and structured in accordance with the disclosed embodiments, without limitation. The rotary drill bit 500 is used to represent any number of earth-boring tools or drilling tools, including, for example, core bits, roller-cone bits, fixed-cutter bits, eccentric bits, bicenter bits, reamers, reamer wings, or any other downhole tool including superabrasive compacts, without limitation.

The PDCs disclosed herein (e.g., the PDC 100 shown in FIG. 1A) may also be utilized in applications other than cutting technology. For example, the disclosed PDC embodiments may be used in wire dies, bearings, artificial joints, inserts, cutting elements, and heat sinks. Thus, any of the PDCs disclosed herein may be employed in an article of manufacture including at least one superabrasive element or compact.

Thus, the embodiments of PDCs disclosed herein may be used on any apparatus or structure in which at least one conventional PDC is typically used. In one embodiment, a rotor and a stator, assembled to form a thrust-bearing apparatus, may each include one or more PDCs (e.g., the PDC 100 shown in FIG. 1A) configured according to any of the embodiments disclosed herein and may be operably assembled to a downhole drilling assembly. U.S. Pat. Nos. 4,410,054; 4,560,014; 5,364,192; 5,368,398; and 5,480,233, the disclosure of each of which is incorporated herein, in its entirety, by this reference, disclose subterranean drilling systems within which bearing apparatuses utilizing superabrasive compacts disclosed herein may be incorporated. The embodiments of PDCs disclosed herein may also form all or part of heat sinks, wire dies, bearing elements, cutting elements, cutting inserts (e.g., on a roller-cone-type drill bit), machining inserts, or any other article of manufacture as known in the art. Other examples of articles of manufacture that may use any of the PDCs disclosed herein are disclosed in U.S. Pat. Nos. 4,811,801; 4,274,900; 4,268,276; 4,468,138; 4,738,322; 4,913,247; 5,016,718; 5,092,687; 5,120,327; 5,135,061; 5,154,245; 5,460,233; 5,544,713; and 6,793,681, the disclosure of each of which is incorporated herein, in its entirety, by this reference.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall have the same meaning as the word "comprising" and variants thereof (e.g., "comprise" and "comprises").

What is claimed is:

1. A method of fabricating a polycrystalline diamond compact, comprising:
    implanting carbon ions into a cementing constituent of a region of a substrate; infiltrating a plurality of diamond particles with the implanted cementing constituents from the substrate; and
    sintering the plurality of diamond particles in the presence of the infiltrated and implanted cementing constituent to form a polycrystalline diamond table.

2. The method of claim 1 wherein implanting carbon ions into a cementing constituent of a region of a substrate comprises implanting a dose of the carbon ions into the cementing constituent exhibiting a concentration of about $10^{15}$ ions per $cm^2$ to about $10^{18}$ ions per $cm^2$.

3. The method of claim 1 wherein the substrate comprises a cemented carbide substrate including the cementing constituent therein.

4. The method of claim 1 wherein the substrate comprises titanium carbide, niobium carbide, tantalum carbide, vanadium carbide, tungsten carbide, or combinations thereof cemented with the cementing constituent, and wherein the cementing constituent comprises iron, nickel, cobalt, or alloys thereof.

5. The method of claim 1 wherein the substrate comprises an interfacial surface, and the region of the substrate extends inwardly from the interfacial surface to a depth of about 1 nm to about 1500 nm.

6. The method of claim 5 wherein the depth is about 300 nm to about 800 nm.

7. The method of claim 1 wherein implanting carbon ions into a cementing constituent of a region of a substrate comprises at least saturating the cementing constituent of the region of the substrate with the carbon ions.

8. The method of claim 1 wherein implanting carbon ions into a cementing constituent of a region of a substrate comprises supersaturating the cementing constituent of the region of the substrate with the carbon ions.

9. The method of claim 1 wherein at least a portion of the cementing constituent of the region of the substrate implanted with the carbon ions comprises carbon fibrules.

10. The method of claim 1 wherein sintering the plurality of diamond particles in the presence of the infiltrated and implanted cementing constituent to form a polycrystalline diamond table comprises subjecting the substrate and the plurality of diamond particles to a high-pressure/high-temperature process under diamond-stable conditions.

11. The method of claim 1, further comprising implanting carbon ions into the infiltrated cementing constituent of the polycrystalline diamond table.

12. A method of fabricating a polycrystalline diamond compact, comprising:
  implanting carbon ions into a cementing constituent of a region of a cemented carbide substrate;
  positioning an at least partially leached polycrystalline diamond table adjacent to the region of the cemented carbide substrate implanted with the carbon ions to form an assembly;
  subjecting the assembly to a high-pressure/high-temperature process; and
  at least partially infiltrating the at least partially leached polycrystalline diamond table with at least some of the cementing constituent from the region of the cemented carbide substrate, in response to the high-pressure/high-temperature process, to form an at least partially infiltrated polycrystalline diamond table.

13. The method of claim 12, further comprising at least partially removing the at least some of the cementing constituent present in the at least partially infiltrated polycrystalline diamond table.

14. The method of claim 12, further comprising implanting carbon ions into the infiltrated cementing constituent.

15. The method of claim 12 wherein the cemented carbide substrate comprise titanium carbide, niobium carbide, tantalum carbide, vanadium carbide, tungsten carbide, or combination thereof cemented with the cementing constituent, and wherein the cementing constituent comprises iron, nickel, cobalt, or alloys thereof.

16. The method of claim 12, wherein the cemented carbide substrate comprises an interfacial surface, and the region of the cemented carbide substrate extends inwardly from the interfacial surface to a depth of about 1 nm to about 1500 nm.

17. The method of claim 16 wherein the depth is about 300 nm to about 800 nm.

18. The method of claim 12 wherein implanting carbon ions into a cementing constituent of a region of a cemented carbide substrate comprises at least saturating the cementing constituent of the region of the cemented carbide substrate with the carbon ions.

19. The method of claim 12 wherein implanting carbon ions into a cementing constituent of a region of a cemented carbide substrate comprises supersaturating the cementing constituent of the region of the cemented carbide substrate with the carbon ions.

20. The method of claim 12 wherein at least a portion of the cementing constituent of the region of the cemented carbide substrate implanted with the carbon ions comprises carbon fibrules.

* * * * *